(12) United States Patent
Haraguchi

(10) Patent No.: US 10,141,660 B2
(45) Date of Patent: Nov. 27, 2018

(54) ELECTRICAL CONNECTION BOX AND CONNECTION TERMINAL COMPONENT

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Akira Haraguchi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/549,511

(22) PCT Filed: Feb. 3, 2016

(86) PCT No.: PCT/JP2016/053175
§ 371 (c)(1),
(2) Date: Aug. 8, 2017

(87) PCT Pub. No.: WO2016/136408
PCT Pub. Date: Sep. 1, 2016

(65) Prior Publication Data
US 2018/0034169 A1     Feb. 1, 2018

(30) Foreign Application Priority Data

Feb. 24, 2015   (JP) ................................ 2015-033983

(51) Int. Cl.
*H01R 4/30*      (2006.01)
*H02G 3/16*      (2006.01)
(Continued)

(52) U.S. Cl.
CPC ......... *H01R 4/305* (2013.01); *B60R 16/0238* (2013.01); *H01R 11/12* (2013.01);
(Continued)

(58) Field of Classification Search
CPC ........... H05K 7/026; F16B 35/06; H01R 4/36; H01R 4/363; H01R 4/366; H01R 4/305;
(Continued)

(56) References Cited

U.S. PATENT DOCUMENTS 6,322,376 B1 *  11/2001  Jetton ................... H01R 4/302
                                                           411/107
7,850,462 B2 *  12/2010  Nakagawa ........... H01R 11/287
                                                           439/620.27

(Continued)

FOREIGN PATENT DOCUMENTS

JP    2009-146933 A    7/2009
JP    2011-097707 A    5/2011
JP    2013-150518 A    8/2013

OTHER PUBLICATIONS

Search Report for PCT/JP2016/053175, dated Apr. 19, 2016.

*Primary Examiner* — Gary F Paumen
(74) *Attorney, Agent, or Firm* — Honigman Miller Schwartz and Cohn LLP

(57) ABSTRACT

An electrical connection box includes: a circuit portion having bus bars including bus bar terminal portions; a case housing a circuit portion with electronic components mounted thereon; a through-hole is formed in each of the bus bar terminal portions; electrical wire terminal portions are connected to electrical wires, a through-hole is formed in each electrical wire terminal portions; stud bolts having a shaft portion and a head portion; and nuts are fastened to the stud bolts. The shaft portion is inserted into the through-holes of both the bus bar terminal portions and the electrical wire terminal portions, the bus bar terminal portions and the
(Continued)

electrical wire terminal portions are overlaid on seat surfaces of the stud bolts, and a groove portion is formed over the entire circumference of each of the stud bolts where the seat surface and the outer circumferential surface of the shaft portion intersect.

4 Claims, 12 Drawing Sheets

(51) Int. Cl.
    *H02G 5/00* (2006.01)
    *H01R 11/12* (2006.01)
    *B60R 16/023* (2006.01)
    *H01R 25/16* (2006.01)

(52) U.S. Cl.
    CPC ............. *H01R 25/165* (2013.01); *H02G 3/16* (2013.01); *H01R 2201/26* (2013.01); *H02G 5/00* (2013.01)

(58) Field of Classification Search
    CPC .. H01R 11/12; H01R 25/165; H01R 25/2201; H01R 25/26; H02G 3/16; H02G 5/00; B60R 16/0238
    USPC ..................... 439/76.2, 810–814; 411/55, 34
    See application file for complete search history.

(56) References Cited

U.S. PATENT DOCUMENTS

| | | | | |
|---|---|---|---|---|
| 8,350,151 | B2* | 1/2013 | Asao | H01R 13/6315 |
| | | | | 174/50 |
| 8,395,061 | B2* | 3/2013 | Asao | H02G 3/16 |
| | | | | 174/50 |
| 2004/0029420 | A1* | 2/2004 | Yamaguchi | H01R 9/2466 |
| | | | | 439/76.2 |
| 2006/0270252 | A1* | 11/2006 | Muto | H01R 4/34 |
| | | | | 439/76.2 |
| 2007/0015384 | A1* | 1/2007 | Asao | H05K 7/026 |
| | | | | 439/76.2 |
| 2007/0098520 | A1* | 5/2007 | Schraer | F16B 33/004 |
| | | | | 411/179 |
| 2011/0094767 | A1* | 4/2011 | Asao | H01R 9/2491 |
| | | | | 174/50 |
| 2013/0029501 | A1* | 1/2013 | I | H01R 9/226 |
| | | | | 439/76.2 |
| 2013/0185917 | A1* | 7/2013 | Diehl | B23P 19/00 |
| | | | | 29/456 |
| 2014/0154897 | A1* | 6/2014 | Makino | H01R 9/16 |
| | | | | 439/76.2 |
| 2014/0363256 | A1* | 12/2014 | Wang | F16B 35/06 |
| | | | | 411/395 |

\* cited by examiner

ELECTRICAL CONNECTION BOX AND CONNECTION TERMINAL COMPONENT

CROSS-REFERENCE TO RELATED APPLICATIONS

This application is the U.S. national stage of PCT/JP2016/053175 filed Feb. 3, 2016, which claims priority of Japanese Patent Application No. JP 2015-033983 filed Feb. 24, 2015.

TECHNICAL FIELD

The present invention relates to an electrical connection box and a connection terminal component.

BACKGROUND

Recent years have seen the development of automobiles in which an auxiliary power supply is installed in addition to the main battery in order to improve fuel efficiency and give consideration to environmental issues. For example, there are cases where regenerative energy obtained during braking is stored in the auxiliary power supply and then used when supplying power to electrical components during traveling, thus reducing the amount of power generated by the alternator and improving fuel efficiency. There are also cases where power is supplied from the auxiliary power supply to the starter when restarting the engine after idling stop, thus preventing power flickering in electrical components and main battery degradation caused by a sudden drop in voltage in the main battery.

An apparatus is disposed between the main battery and the auxiliary power supply in order to switch the power supply mode according to the operating state of the vehicle, such as traveling or idling stop. Mechanical relays that conduct a large current have conventionally been used in this type of apparatus, but replacement with semiconductor switching elements has been proposed in order to achieve size reduction, lifetime extension, and noise reduction. A power semiconductor such as a MOSFET (Metal-Oxide-Semiconductor Field-Effect Transistor) is used as the semiconductor switching elements (see JP 2009-146933A).

Also, paths for the conduction of a large current need to be connected reliably, and therefore instead of connecting connectors to each other, connection has been performed by overlaying terminals at the ends of paths and fastening them together using bolts and nuts. In this case, terminals can be connected by inserting the shaft portion of a bolt into the through-holes of the terminals, bringing one of the terminals into contact with the seat surface, and fastening a nut to the other side.

In this case, the bolt is generally molded using a die, and it is generally the case that a right angle is not completely formed at the location where the seat surface and the outer circumferential surface of the shaft portion intersect, and instead a curved surface bulges in the boundary portion between the seat surface and the outer circumferential surface of the shaft portion. The through-holes of the terminals are given a small hole diameter in order to ensure a sufficient area of contact between the terminals, and therefore if a curved surface is formed at the boundary portion between the seat surface and the outer circumferential surface of the shaft portion, there is concern that the hole edge of the through-hole of the terminal will become caught on the curved surface such that the terminal will not be connected at a predetermined position, thus increasing contact resistance between terminals.

The present invention was achieved in light of the above-described situation, and an object thereof is to suppress an increase in contact resistance between terminal portions.

SUMMARY

An electrical connection box of the present invention includes: a circuit portion that has a bus bar as a conduction path, an electronic component being mounted on the circuit portion; a case in which the circuit portion is housed; a bus bar terminal portion that is provided on the bus bar, a through-hole being formed in the bus bar terminal portion; an electrical wire terminal portion that is connected to an electrical wire, a through-hole being formed in the electrical wire terminal portion; a bolt that has a shaft portion and a head portion; and a nut that is fastened to the bolt, wherein the shaft portion of the bolt is inserted into the through-hole of the bus bar terminal portion and the through-hole of the electrical wire terminal portion, the bus bar terminal portion and the electrical wire terminal portion are overlaid on a seat surface of the bolt, and a groove portion is formed over an entire circumference of the bolt at a position where the seat surface and an outer circumferential surface of the shaft portion intersect.

A connection terminal component of the present invention includes: a bus bar terminal portion that is provided on a bus bar that serves as a conduction path, a through-hole being formed in the bus bar terminal portion; an electrical wire terminal portion that is connected to an electrical wire, a through-hole being formed in the electrical wire terminal portion; a bolt that has a shaft portion and a head portion; and a nut that is fastened to the bolt, wherein the shaft portion of the bolt is inserted into the through-hole of the bus bar terminal portion and the through-hole of the electrical wire terminal portion, the bus bar terminal portion and the electrical wire terminal portion are overlaid on a seat surface of the bolt, and a groove portion is formed over an entire circumference of the bolt at a position where the seat surface and an outer circumferential surface of the shaft portion intersect.

According to the present invention, the groove portion is formed over the entire circumference of the bolt at a position where the seat surface and the outer circumferential surface of the shaft portion intersect, and therefore a curved surface does not bulge at the position of intersection between the seat surface and the outer circumferential surface of the shaft portion. Accordingly, out of the through-holes of the bus bar terminal portion and the electrical wire terminal portion, even if the hole diameter of the through-hole on the side in contact with the seat surface of the bolt is reduced, the bus bar terminal portion or the electrical wire terminal portion will not become caught on a curved surface formed at the position of intersection between the seat surface of the bolt and the outer circumferential surface of the shaft portion. Therefore, the bus bar terminal portion and the electrical wire terminal portion can be arranged at predetermined positions overlaid on the seat surface without a gap therebetween, thus making it possible to suppress an increase in contact resistance between terminal portions.

The following configurations are possible as modes for carrying out the present invention.

The groove portion is recessed in a direction along an axial direction of the shaft portion.

According to this configuration, formation of the groove portion using a die is easier than with a configuration in which the groove portion is recessed in a direction along the seat surface, for example.

Out of the through-holes of the bus bar terminal portion and the electrical wire terminal portion, a hole edge of the through-hole on a side in contact with the seat surface is arranged at a position overlapped with the groove portion.

According to this configuration, the hole diameter of the through-hole is smaller than in the case where the hole edge of the through-hole is arranged outward of the groove portion, thus making it possible to increase the area of contact between the bus bar terminal portion and the electrical wire terminal portion.

Advantageous Effects of Invention

According to the present invention, it is possible to suppress an increase in contact resistance between terminal portions.

DETAILED DESCRIPTION OF PREFERRED EMBODIMENTS

An embodiment will be described below with reference to FIGS. 1 to 12.

An electrical connection box 10 of the present embodiment is used in a vehicle such as an automobile that includes a main battery and an auxiliary battery, in order to switch the supply of power to electrical components, such as headlights and windshield wipers, from the main battery and the auxiliary battery. Hereinafter, the up-down direction and the left-right direction in the description are based on the directions in FIG. 1, but the electrical connection box 10 can be arranged in any orientation.

Electrical Connection Box 10

Figure 1:
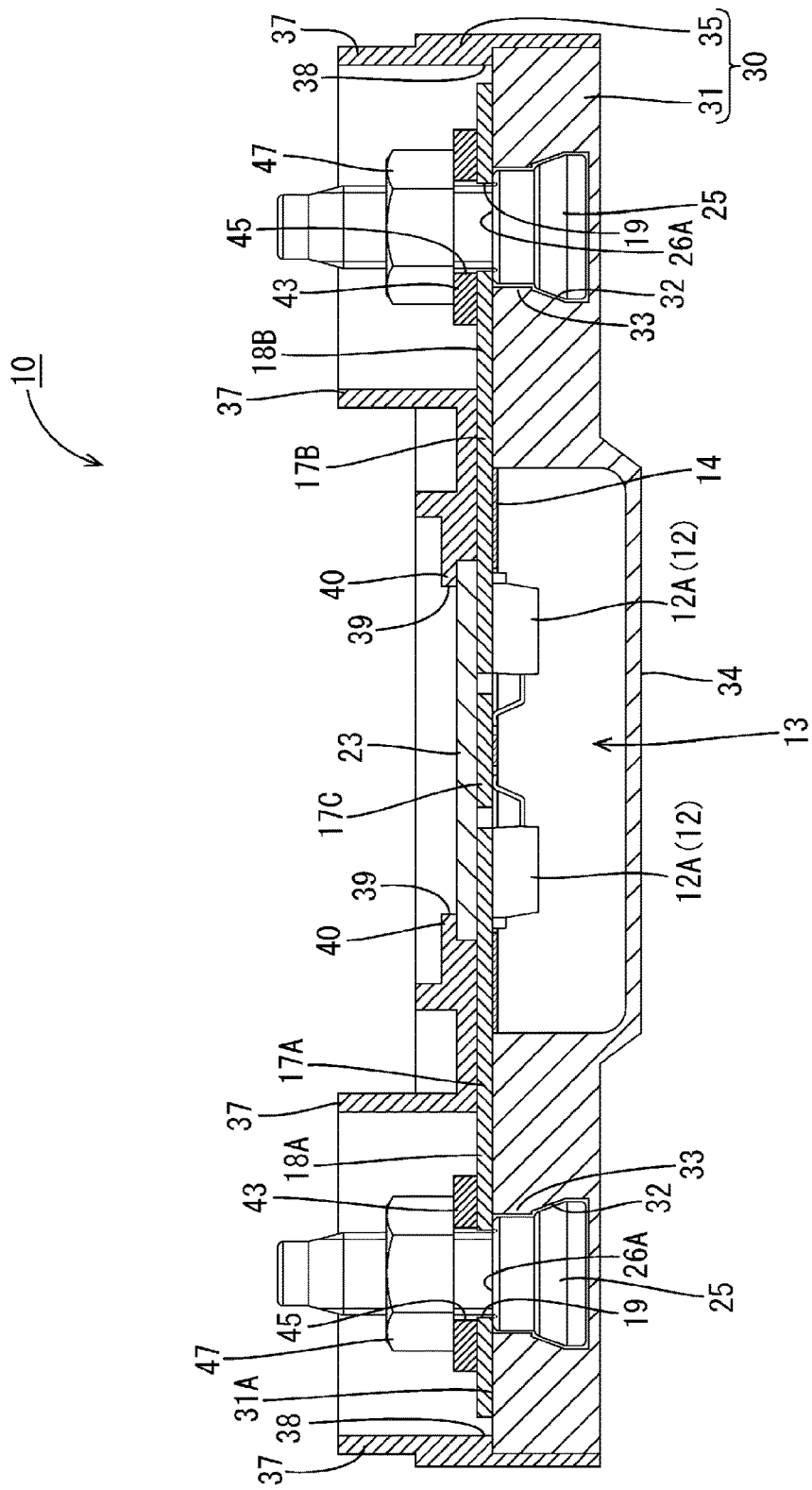
FIG. 1 is a longitudinal sectional view of an electrical connection box according to an embodiment.

As shown in FIG. 1, the electrical connection box 10 includes a circuit portion 13, a heat dissipation plate 23 that is placed on the circuit portion 13, a case 30 that houses the circuit portion 13 and the heat dissipation plate 23, two (a plurality of) stud bolts 25, and two (a plurality of) nuts 47.

Circuit Portion 13

Figure 3:
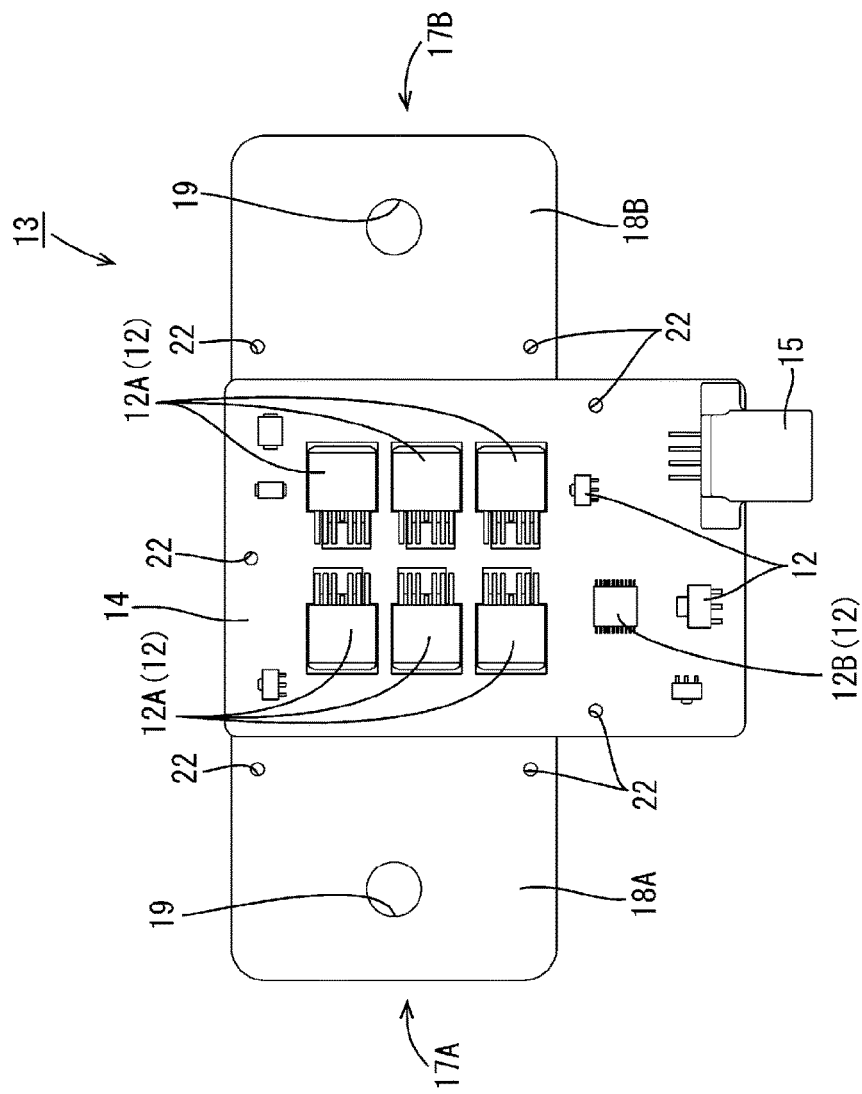
FIG. 3 is a plan view of a circuit portion.

The circuit portion 13 has a control substrate 14 and three (a plurality of) bus bars 17A to 17C, and a plurality of electronic components 12 are mounted on the circuit portion 13. As shown in FIG. 3, included among the electronic components 12 are a plurality of switching elements 12A, which are constituted by power MOSFETs for example, and an IC (Integrated Circuit) 12B. The switching elements 12A switch on and off the conduction of current to the bus bars 17A to 17C. The switching elements 12A have lower-surface lead terminals that are soldered to the upper surfaces of the bus bars 17A and 17B, and side-surface lead terminals that are soldered to conduction paths of the control substrate 14 and the bus bar 17C.

Note that the reason that three (a plurality of) switching element are arranged side-by-side is that a large current can be allowed to flow by distributing the flowing current according to the capacities of the switching elements 12A, and the reason that three switching elements 12A are arranged in an opposite orientation (direction opposite to the current supply direction) is that this prevents the reverse flow of current (caused by a parasitic diode) when the switches are turned off.

The control substrate 14 is obtained by using printed wiring technology to form conduction paths made of copper foil or the like on the surface of an insulating plate made of a glass board or a nonwoven glass fabric board. A connector 15 is attached to a peripheral edge portion of the control substrate 14. Connector terminals of the connector 15 are held in a housing, and the connector terminals extend rearward from the housing and are soldered to the conduction paths of the control substrate 14. A partner connector (not shown) is connected to the connector 15 to enable the input and output of control signals for controlling the switching elements 12A, output signals, and the like.

Bus Bars 17A-17C

The three bus bars 17A are used as conduction paths for a relatively large current that enables operation of the electrical components, and are formed with predetermined shapes that correspond to the shapes of the conduction paths by performing punching processing on a metal plate that is made of oxygen-free copper (C1020, JIS alloy designation).

The reason that the bus bars 17A to 17C are entirely formed from oxygen-free copper (C1020) is that heat generation needs to be taken into consideration for the bus bars 17A to 17C that conduct a large current, as with the electrical connection box 10. Whereas the conductivity of copper alloy (C19020, JIS alloy designation) is 50% IACS (International Annealed Copper Standard), the conductivity of oxygen-free copper is higher at 101% IACS, and therefore using oxygen-free copper makes it possible to keep heat generation at a low level.

As shown in FIG. 1, the three bus bars 17A to 17C are arranged side-by-side in the left-right direction with gaps therebetween, the bus bar 17C in the center is T-shaped and has a portion that extends in the front-back direction between the bus bars 17A and 17B and portions that extend in the left-right direction, and the entirety of the bus bar 17C is overlapped by the control substrate 14. The left and right bus bars 17A and 17B have a rectangular shape, are arranged adjacent to the bus bar 17C, and are overlapped by the control substrate 14, and portions thereof that are not overlapped by the control substrate 14 serve as bus bar terminal portions 18A and 18B that extend to the left and right (outward) in a flush manner (in the same plane).

Bus Bar Terminal Portions 18A, 18B

Figure 2:
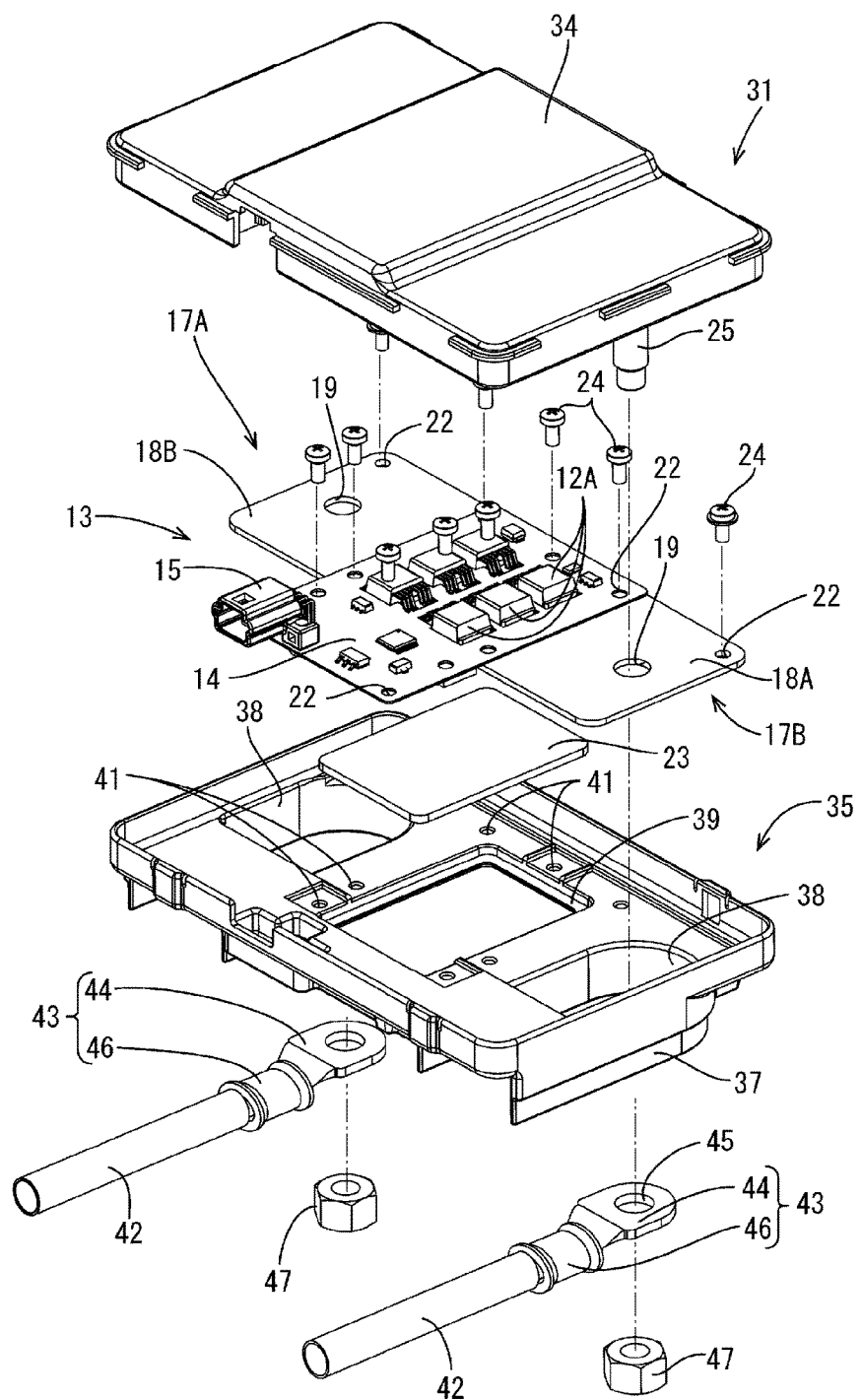
FIG. 2 is an exploded perspective view of the electrical connection box.

As shown in FIG. 2, the bus bar terminal portions 18A and 18B have a rectangular shape, and are each provided with a through-hole 19 through which a shaft portion 27 of a stud bolt 25 is inserted. The through-holes 19 are shaped as circles that are slightly larger than the outer circumference of the shaft portions 27. A plurality of circular screw holes 22 for the screwing of screws 24 are formed at positions biased toward peripheral edge portions in the control substrate 14 and the bus bars 17A to 17C.

Heat Dissipation Plate 23

The heat dissipation plate 23 is for dissipating heat from the control substrate 14 and the bus bars 17A to 17C to the outside, is formed from aluminum, an aluminum alloy, or the like, and is affixed, using an adhesive or the like, to the bus bars 17A to 17C in a region that includes the six switching elements 12A that generate a large amount of heat.

Case 30

The case 30 is made of a synthetic resin, and as shown in FIG. 1, is formed by fitting together a lower case 31 and an upper case 35. The lower case 31 includes an opposing wall 34 that opposes the control substrate 14 with a gap therebetween, and housing chambers 32 for housing the head portions 26 of the stud bolts 25 are formed on the left and right sides by forming recessions in the upper surface of the lower case 31.

The housing chambers 32 are formed with a rectangular shape that corresponds to the rectangular shape of the head portions 26 of the stud bolts 25 at the upper surface of the lower case 31. The housing chambers 32 are provided with grid-like ribs 33 that project inward on the upper sides of the inner walls, and the stud bolts 25 are retained by these ribs 33. When the head portions 26 are inserted into the housing chambers 32, the head portions 26 may be placed in the housing chambers 32 by making it possible to avoid the ribs 33 depending on the rotation angle of the head portions 26, or by providing the lower case 31 with notches that allow the head portions 26 to be inserted from the side, for example.

The upper case 35 includes insulating walls 37 that enable placement of the terminal portions of electrical wires 42 on the two left and right end sides, and are also for insulting the terminal portions of the electrical wires 42 and the electrical wire terminal portions 43. Opening portions 38 that expose the electrical wire terminal portions 43 and the bus bar terminal portions 18A and 18B are formed inward of the insulating walls 37 so as to penetrate in the up-down direction. The opening portions 38 are formed large enough to allow the electrical wire terminal portions 43 to be connected to the bus bar terminal portions 18A and 18B, and the bus bar terminal portions 18A and 18B are exposed before attachment of the electrical wire terminal portions 43. The insulating walls 37 extend in the shape of a U that surrounds the terminal portions of the electrical wires 42 and the electrical wire terminal portions 43, and portions of the insulating walls 37 are not formed in portions where the electrical wires 42 extend outward.

A heat dissipation hole 39 for exposing the heat dissipation plate 23 is formed in an intermediate portion, with respect to the left-right direction, of the upper case 35. The heat dissipation hole 39 has a rectangular shape that corresponds to the shape of the heat dissipation plate 23, and the hole edge portion of the heat dissipation hole 39 serves as a holding protrusion portion 40 that holds the peripheral edge portion of the heat dissipation plate 23 and sandwiches the heat dissipation plate 23 along with the circuit portion 13. As shown in FIG. 2, a plurality of screw holes 41 are formed in the bottom face of the upper case 35 in order for the circuit portion 13 to be screwed thereto using screws 24.

The electrical wires 42 are each a covered wire having a conductor portion covered by an insulating coating, and an exposed conductor portion that is obtained by stripping the insulating coating from the terminal portion is attached to an electrical wire terminal portion 43. The conductor portion is a stranded wire obtained by twisting together a large number of metal strands, for example. The electrical wire terminal portion 43 is a so-called round terminal, and has a plate-shaped connection portion 44 and a barrel portion 46. A through-hole 45 for insertion of the shaft portion 27 of a stud bolt 25 is formed in the connection portion 44. The barrel portion 46 is tube-shaped, and is crimped around the conductor portion of the electrical wire 42 inserted through it. The electrical wires 42 are connected to the main battery and the auxiliary battery.

Stud Bolt 25

Figure 4:
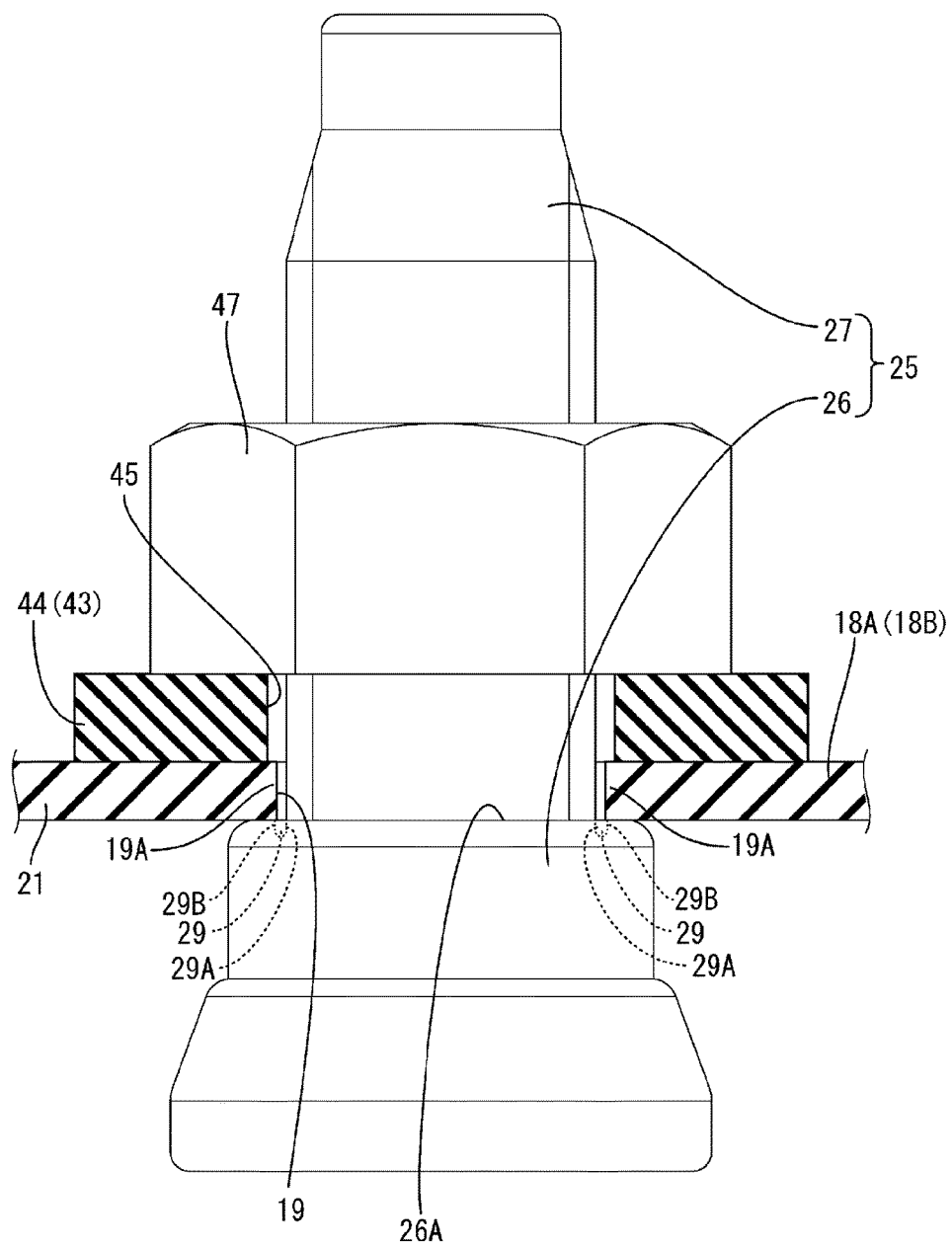
FIG. 4 is a diagram showing an enlarged view of a portion in which a stud bolt and a nut are fastened.
Figure 5:
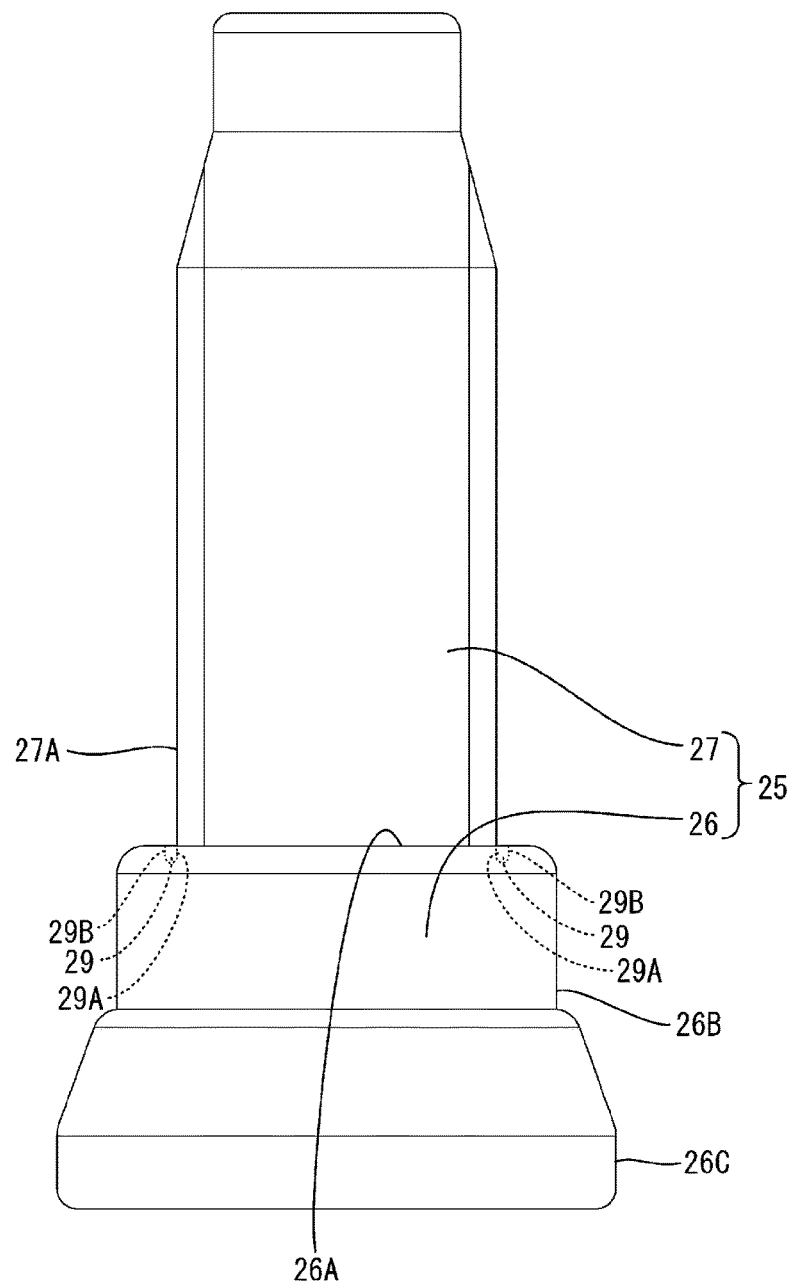
FIG. 5 is a front view of a stud bolt.
Figure 6:
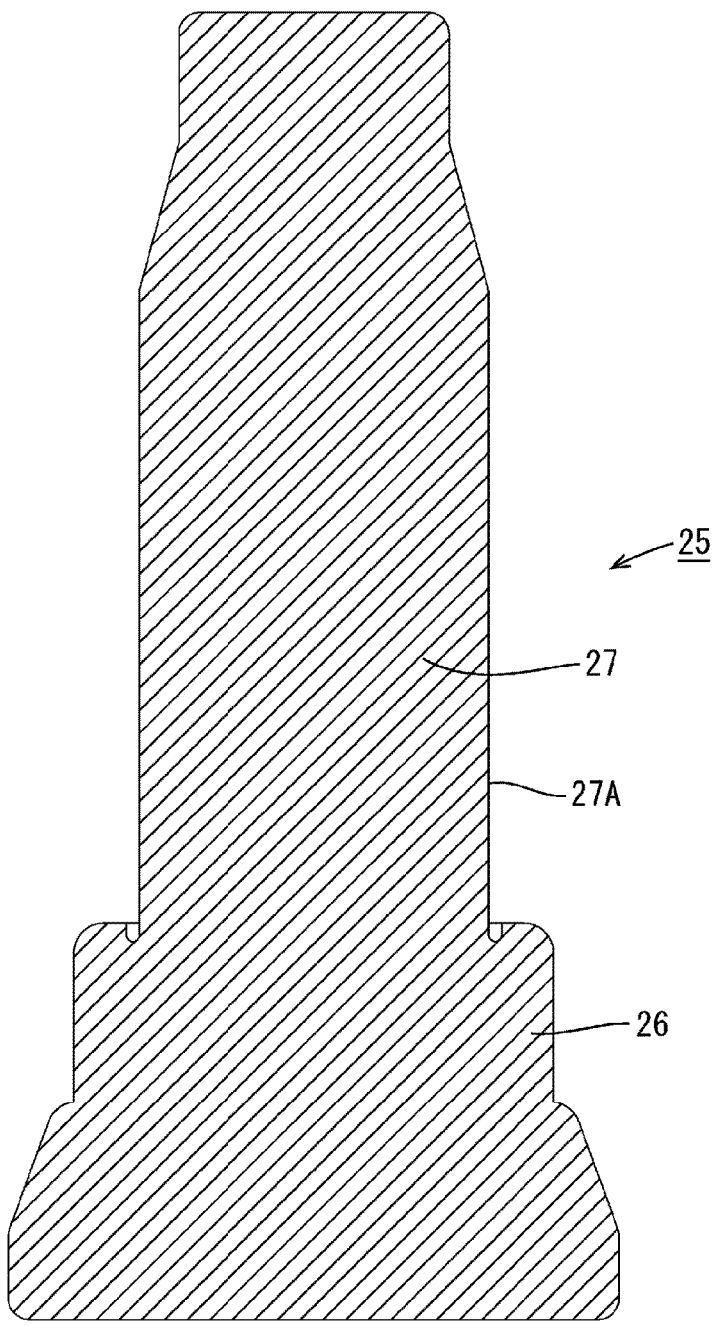
FIG. 6 is a longitudinal sectional view of the stud bolt.
Figure 7:
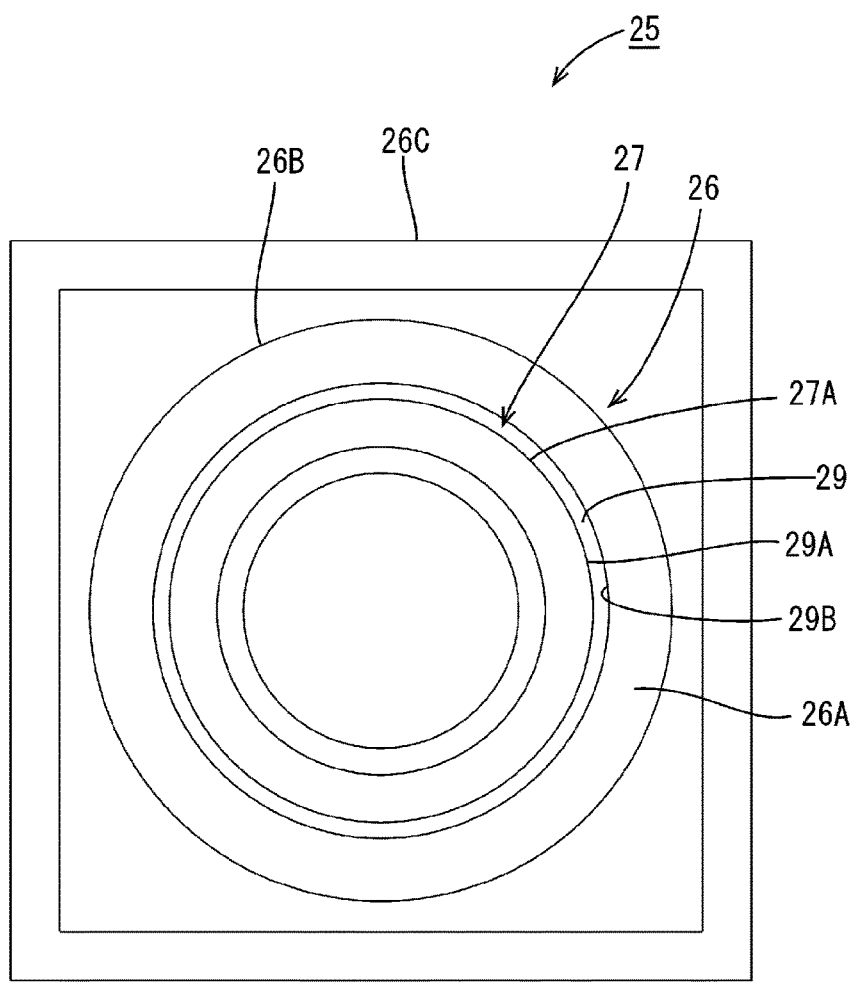
FIG. 7 is a plan view of the stud bolt.

The stud bolts 25 are each made of a metal, and as shown in FIGS. 4 and 5, each have a shaft portion 27 that has a cylindrical outer circumferential surface 27A in which a thread groove is formed, and a prismatic head portion 26 provided at the lower end portion of the shaft portion 27. The upper portion of the head portion 26 is a cylindrical portion 26B that has a cylindrical shape, and the lower portion is a rectangular portion 26C that has a rectangular shape. When the head portion 26 is housed in one of the housing chambers 32 of the case 30, rotation of the stud bolt 25 is prevented by the shape of the rectangular portion 26C.

The level-difference portion between the head portion 26 and the shaft portion 27 (the upper surface of the cylindrical portion 26B) serves as a seat surface 26A. The area of the seat surface 26A (area of the surface that comes into contact with the bus bar terminal portion 18A or 18B) is smaller than the area of the surface where a nut 47, which is constituted by a metal hexagonal nut 47, comes into contact with the bus bar terminal portion 18A or 18B. For this reason, when bolt fastening is performed, the bus bar terminal portion 18A or 18B that comes into contact with the seat surface 26A is subjected to stronger force per unit of area and more easily deforms in comparison with the electrical wire terminal portion 43 that comes into contact with the nut 47.

A groove portion 29 is formed over the entire circumference of the stud bolt 25 at a position where the seat surface 26A and the outer circumferential surface 27A of the shaft portion 27 intersect (a position that includes the circular line of intersection between the seat surface 26A and the outer circumferential surface 27A, as well as the vicinity of the circular line). The groove portion 29 is recessed downward (direction along the axial direction of the shaft portion 27), and an inward edge 29A (inner diameter) of the groove portion 29 is at the same position as the outer circumferential surface 27A (flush with the outer circumferential surface 27A). A hole edge 19A (hole wall) of the through-hole 19 of the bus bar terminal portion 18A or 18B is arranged between the inward edge 29A and an outward edge 29B of the groove portion 29 (i.e., at a position overlapped with the groove portion 29). In the present embodiment, the hole edge 19A of the through-hole 19 and the outward edge 29B of the groove portion 29 are arranged at approximately the same position. It is sufficient that the depth of the groove portion 29 is a depth according to which at least the bottom of the groove is at a position lower than the height of the seat surface 26A.

Note that connection terminal components for electrically connecting the bus bars 17A and 17B to the electrical wires 42 are constituted by the bus bar terminal portion 18A and 18B, the electrical wire terminal portions 43, the stud bolts 25, and the nuts 47.

Figure 8:
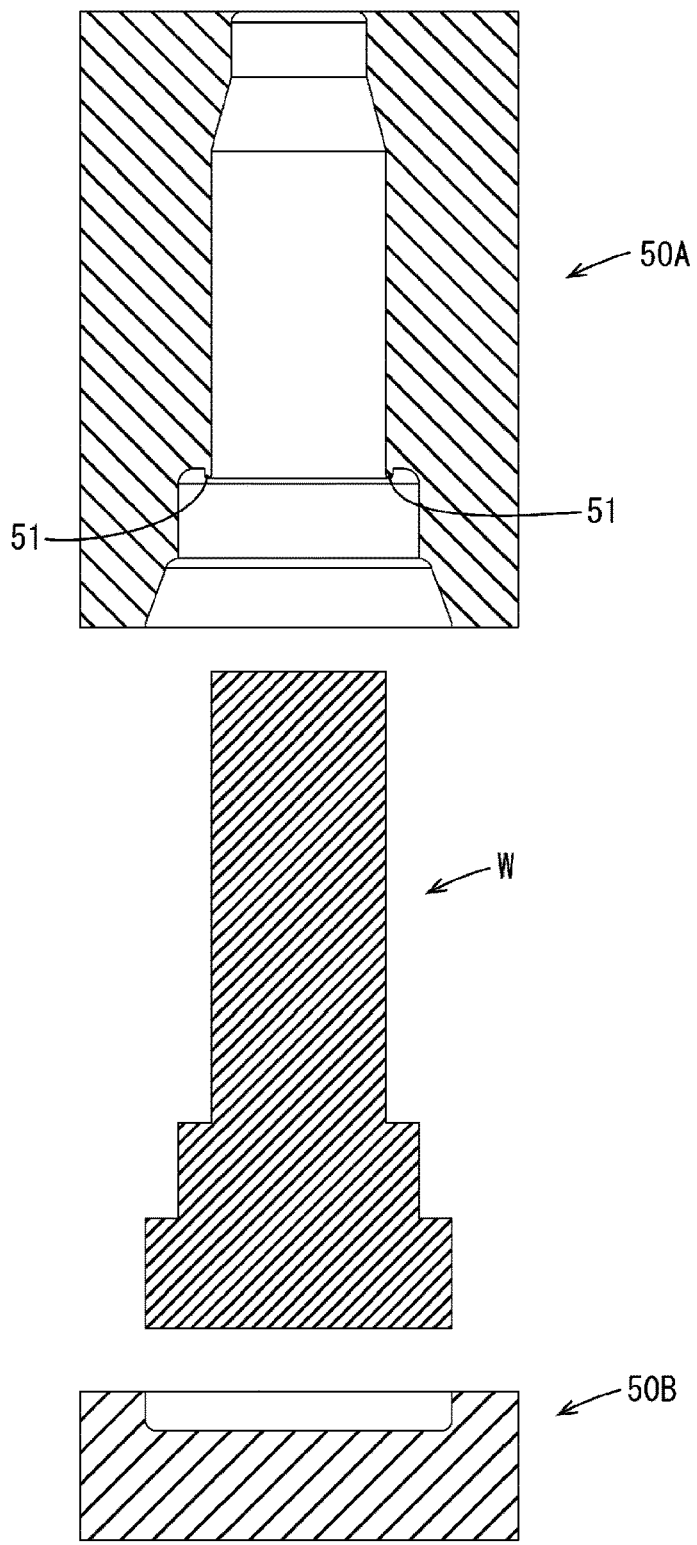
FIG. 8 is a longitudinal sectional view of a state before insertion of a workpiece into a die.
Figure 9:
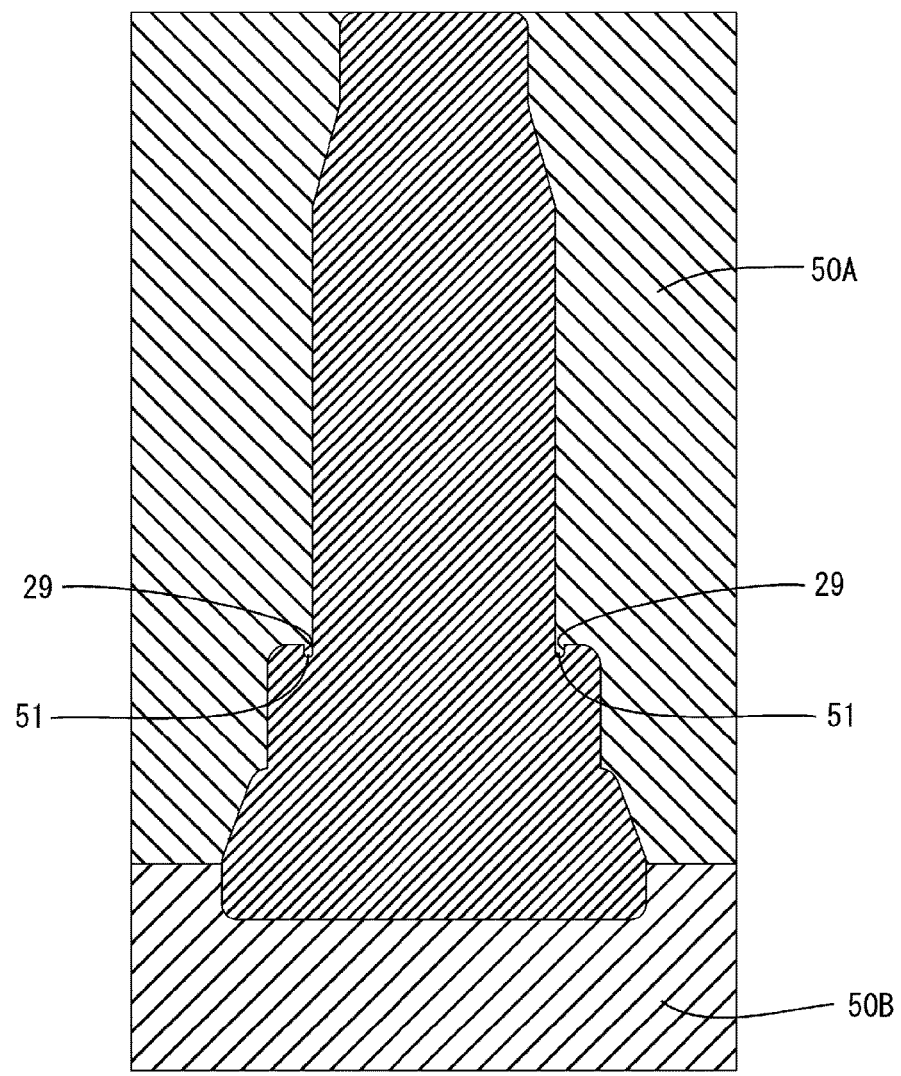
FIG. 9 is a longitudinal sectional view of a state in which the workpiece has been inserted into the die.

As shown in FIG. 8, in order to form the stud bolt 25, a workpiece W, which is shaped as a stud bolt in which the groove portion 29 is not formed, and upper and lower dies 50A and 50B for processing the workpiece W are prepared.

The processing surfaces of the upper and lower dies 50A and 50B have a shape that corresponds to the shape of the stud bolt, and a ring-shaped projection portion 51 that corresponds to the position of the groove portion 29 is formed so as to project downward from the upper die 50A. When the workpiece W is fitted between the upper and lower dies 50A and 50B (FIG. 9), the ring-shaped groove portion 29 is formed by the projection portion 51.

Figure 10:
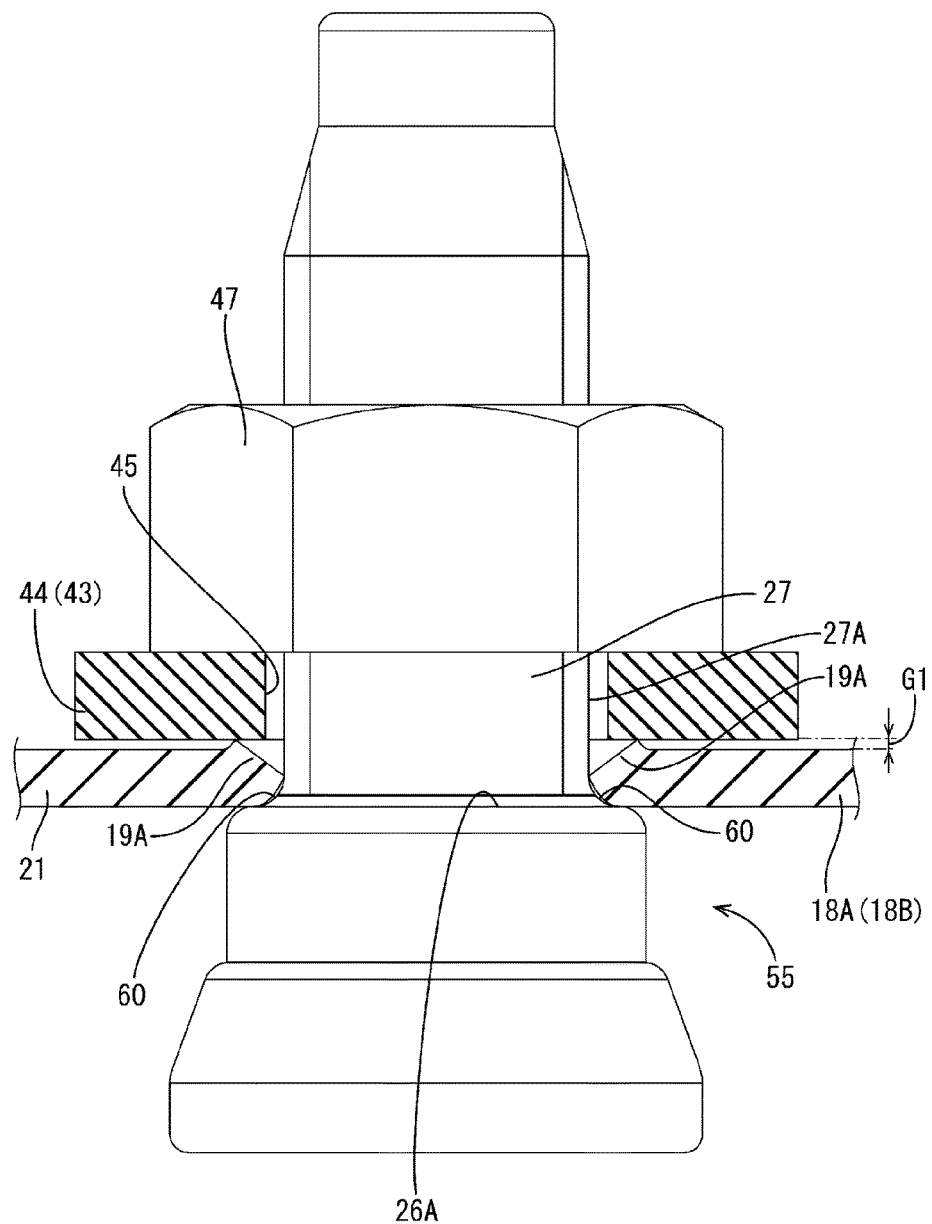
FIG. 10 is a diagram showing an enlarged view of a portion in which a stud bolt and a nut are fastened, as a comparative example.

Next, the case of not forming the groove portion 29 will be described as a comparative example. As shown in FIG. 10, when processing using the die is performed, a curved surface portion 60 that bulges outward in a curved manner is formed in the boundary portion where the seat surface 26A intersects with the outer circumferential surface 27A of the shaft portion 27 of a stud bolt 55.

The electrical wire terminal portion 43 is then placed on the bus bar terminal portion 18A or 18B, the shaft portion 27 of the stud bolt 25 is inserted into the through-holes 19 and 45, and then the bus bar terminal portion 18A or 18B is moved in the direction of coming into contact with the seat surface 26A. In this case, in order to ensure sufficient area of contact between terminal portions, the through-hole 19 of the bus bar terminal portion 18A or 18B is formed such that the hole diameter of the through-hole 19 is slightly larger than the outer circumferential surface 27A, and therefore the hole edge 19A of the through-hole 19 of the bus bar terminal portion 18A or 18B becomes caught on the curved surface portion 60. If the nut 47 is fastened in this state, the hole edge 19A of the through-hole 19 deforms along the curved surface portion 60, a gap G1 is formed between the electrical wire terminal portion 43 and the bus bar terminal portion 18A or 18B, the area of contact between the electrical wire terminal portion 43 and the bus bar terminal portion 18A or 18B decreases, and contact resistance between the electrical wire terminal portion 43 and the bus bar terminal portion 18A or 18B increases.

Figure 11:
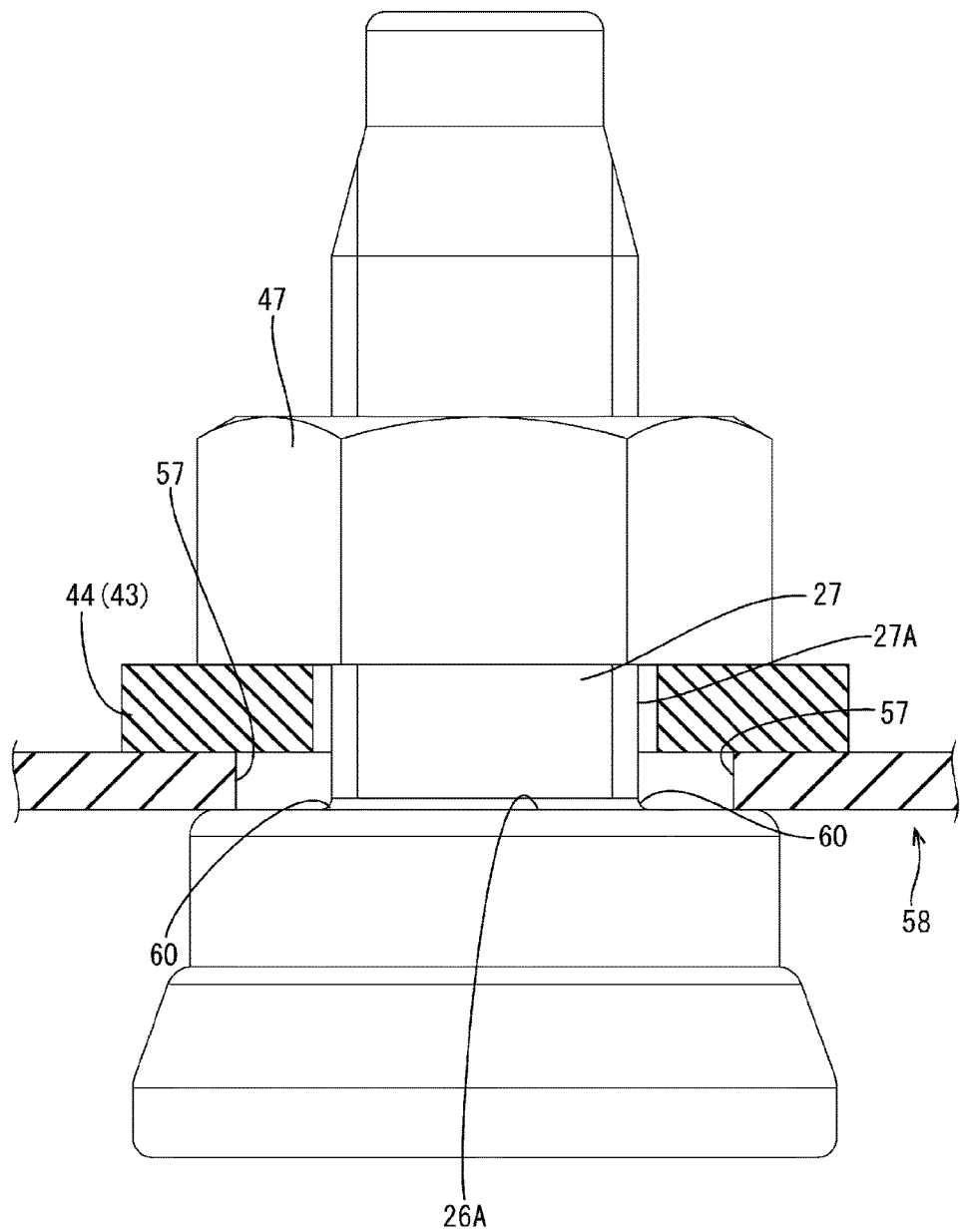
FIG. 11 is a diagram showing an enlarged view of a portion in which a stud bolt and a nut are fastened in the case where the through-hole of the bus bar terminal portion has been enlarged, as a comparative example.
Figure 12:
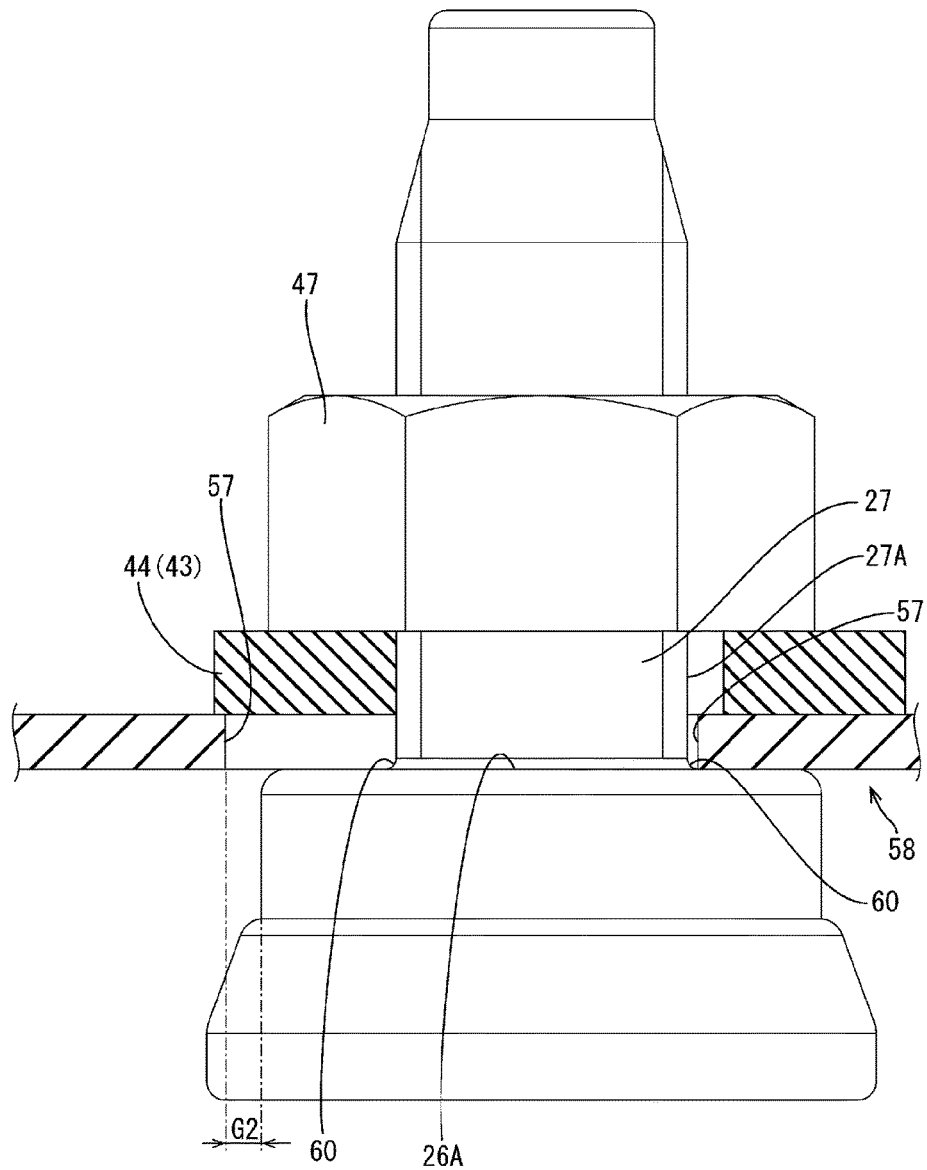
FIG. 12 is a diagram showing a state in which the position of the bus bar terminal portion in FIG. 11 has shifted.

Also, if a through-hole 57 having a larger hole diameter than the through-hole 19 is formed in a bus bar terminal portion 58 as shown in FIG. 11, the hole edge of the through-hole 57 is less likely to become caught on the curved surface portion 60, but the area of contact between the bus bar terminal portion 58 and the electrical wire terminal portion 43 decreases, and as shown in FIG. 12, it is possible for the center of the through-hole 57 and the position of the axis of the shaft portion 27 to become misaligned such that the bus bar terminal portion 58 is biased toward either the left or right side. In this case, a gap G2 is formed between the bus bar terminal portion 58 and the seat surface 26A, and there is a risk that force applied during fastening of the stud bolt 25 and the nut 47 will not be applied uniformly between the bus bar terminal portion 58 and the electrical wire terminal portion 43.

In contrast, in the present embodiment, the groove portion 29 is formed over the entire circumference at the position of intersection between the seat surface 26A and the outer circumferential surface 27A of the shaft portion 27, and therefore even if the hole diameter of the through-hole 19 of the bus bar terminal portion 18A or 18B is reduced, the hole edge 19A of the through-hole 19 will not become caught on the curved surface portion 60 when the through-hole 19 of the bus bar terminal portion 18A or 18B is placed around the shaft portion 27. Accordingly, it is possible to suppress a decrease in the area of contact between the bus bar terminal portions 18A and 18B and the electrical wire terminal portions 43, thus making it possible to suppress an increase in contact resistance between terminal portions.

As described above, the groove portion 29 is formed in order to prevent the formation of the curved surface portion 60, and therefore the width dimension of the groove portion 29 (dimension from the inward edge 29A to the outward edge 29B) is set greater than or equal to the width dimension of the curved surface portion 60 that would be formed during stud bolt processing in the case where the groove portion 29 is not provided.

Next, a method of manufacturing the electrical connection box 10 will be described.

The bus bars 17A to 17C are formed by performing punching processing on a metal plate that is made of oxygen-free copper. Next, the bus bars 17A to 17C are arranged with predetermined gaps therebetween, and the control substrate 14 with copper foil conduction paths printed thereon is affixed at a predetermined position on the bus bars 17A to 17C using a hot press machine and a thermosetting adhesive sheet for example.

Next, the electronic components 12 are mounted to the control substrate 14 and the bus bars 17A to 17C. MOSFETs serving as the switching elements 12A are arranged in parallel lines of three each, with their source terminals facing each other, and the drain terminals are solder-connected to the bus bars 17A and 17B. Also, when the source terminals are solder-connected to the bus bar 17C, the source terminals of MOSFETs that face each other become electrically connected to each other. When all of the electronic components 12 have been mounted, a circuit structure body is obtained.

Next, stud bolts 25 are obtained by placing a workpiece W between the dies 50A and 50B and forming the groove portion 29, and these stud bolts 25 are attached to predetermined positions on the lower case 31. The shaft portions 27 of these stud bolts 25 are inserted into the through-holes 19 of the bus bar terminal portions 18A and 18B, and the circuit structure body is placed on the lower case 31 and screwed thereto using screws 24.

Next, the upper case 35 is placed over and screwed to the lower case 31 so as to be fixed thereto. Next, the through-holes 45 of the electrical wire terminal portions 43 attached to the terminal portions of the electrical wires 42 are placed over the shaft portions 27 of the stud bolts 25, thus overlaying the bus bar terminal portions 18A and 18B and the electrical wire terminal portions 43. Nuts 47 are then screw-fastened to the stud bolts 25.

Actions and effects such as the following are achieved by the present embodiment.

According to the present embodiment, the groove portion 29 is formed over the entire circumference of the stud bolt 25 (bolt) at a position where the seat surface 26A and the outer circumferential surface 27A of the shaft portion 27 intersect, and therefore a curved surface does not bulge at the position of intersection between the seat surface 26A and the outer circumferential surface 27A of the shaft portion 27. Accordingly, even if the hole diameter of the through-hole 19 of the bus bar terminal portion 18A or 18B is reduced, the hole edge 19A of the through-hole 19 will not become caught at the position of intersection between the seat surface 26A and the outer circumferential surface 27A of the shaft portion 27. Therefore, the bus bar terminal portion 18A or 18B and the electrical wire terminal portion 43 can be arranged at predetermined positions overlaid on the seat surface 26A without a gap therebetween, thus making it possible to suppress an increase in contact resistance between the bus bar terminal portion 18A or 18B and the electrical wire terminal portion 43.

Also, the groove portion 29 is recessed downward (direction along the axial direction of the shaft portion 27).

According to this configuration, formation of the groove portion 29 using a die is easier than with a configuration in which the groove portion 29 is recessed in a direction along the seat surface 26A, for example.

Also, the hole edge 19A of the through-hole 19 of the bus bar terminal portion 18A or 18B is arranged between the inward edge 29A and the outward edge 29B of the groove portion 29 (a position overlapped with the groove portion 29).

According to this configuration, the hole diameter of the through-hole 19 is smaller than in the case where the hole edge 19A of the through-hole 19 is arranged outward of the groove portion 29, thus making it possible to increase the area of contact between the bus bar terminal portion 18A or 18B and the electrical wire terminal portion 43.

The bus bars 17A to 17C, which conduct a large current, are formed using oxygen-free copper in order to be able to keep heat generation at a low level, but oxygen-free copper deforms more readily than a copper alloy or the like. Accordingly, if the curved surface portion 60 were formed at the position of intersection between the seat surface 26A and the outer circumferential surface 27A of the shaft portion 27, the hole edge 19A of the through-hole 19 would easily deform upon becoming caught on the curved surface portion 60. In the present embodiment, the groove portion 29 is formed instead of the curved surface portion 60, and therefore it is possible to suppress deformation of the bus bar terminal portions 18A and 18B in a configuration in which the bus bar terminal portions 18A and 18B easily deform due to being formed using oxygen-free copper.

Other Embodiments

The present invention is not intended to be limited to the embodiment described using the above descriptions and drawings, and embodiments such as the following are also encompassed in the technical scope of the present invention.

(1) Although the outward edge 29B of the groove portion 29 is formed at approximately the same position as the hole edge 19A of the through-hole 19 in the above embodiment, the present invention is not limited to this, and the hole edge 19A of the through-hole 19 may be located inward or outward of the outward edge 29B.

(2) Although the groove portion 29 is configured so as to be recessed in a direction along the axial direction of the shaft portion 27, the present invention is not limited to this. For example, a groove portion that is recessed in a direction along the seat surface 26A may be provided.

(3) Although the electrical wire terminal portions 43 are placed over the bus bar terminal portions 18A and 18B in the above embodiment, the electrical wire terminal portions 43 may be placed under the bus bar terminal portions 18A and 18B. For example, the electrical wire terminal portions 43 may be placed under the bus bar terminal portions 18A and 18B by being slid from a direction along the plate surfaces of the bus bar terminal portions 18A and 18B for example.

(4) Although the bus bars 17A to 17C are formed using oxygen-free copper that is pure copper in the above embodiment, the present invention is not limited to this. For example, the bus bars 17A to 17C may be formed using pure copper (purity of 99.9% or more) other than oxygen-free copper, or a material such as a copper alloy having a copper purity that is lower than pure copper.

(5) The shapes of the bus bar terminal portions 18A and 18B and the electrical wire terminal portions 43 are not limited to the shapes described in the above embodiment, and various shapes may be applied as long as it is at least possible to overlay the bus bar terminal portion and the electrical wire terminal portion 43 on each other.

(6) Although the electrical connection box 10 of the above embodiment is used for switching the supply of power to electrical components from the main battery and the auxiliary battery, the present invention is not limited to this. For example, the electrical connection box may be for another application and be arranged in a path from a vehicle power supply to a load. Also, the present invention may be applied to a structure for connecting terminal portions of a member other than an electrical connection box. For example, the bus bar terminal may be the terminal of a battery such as the main battery or the auxiliary battery.

The invention claimed is:

1. An electrical connection box comprising:
a circuit portion that has a bus bar as a conduction path, an electronic component being mounted on the circuit portion;
a case in which the circuit portion is housed;
a bus bar terminal portion that is provided on the bus bar, a through-hole being formed in the bus bar terminal portion; an electrical wire terminal portion that is connected to an electrical wire, a through-hole being formed in the electrical wire terminal portion;
a bolt that has a shaft portion and a head portion having a seat surface concentric to the shaft portion; and
a nut that is fastened to the bolt so as to press the wire terminal portion against the bus bar terminal portion,
wherein the shaft portion of the bolt is inserted into the through-hole of the bus bar terminal portion and the through-hole of the electrical wire terminal portion, the bus bar terminal portion and the electrical wire terminal portion are overlaid on the seat surface of the bolt, and a groove portion is circumferential to the shaft portion of the bolt, the seat surface being concentric to the groove portion, and
the groove portion is recessed in a direction along an axial direction of the shaft portion and at a position where the seat surface and an outer circumferential surface of the shaft portion intersect so as to provide a planar surface engagement between the bus bar terminal portion and the wire terminal portion and facilitate an electrical connection.

2. An electrical connection box comprising:
a circuit portion that has a bus bar as a conduction path, an electronic component being mounted on the circuit portion;
a case in which the circuit portion is housed;
a bus bar terminal portion that is provided on the bus bar, a through-hole being formed in the bus bar terminal portion;
an electrical wire terminal portion that is connected to an electrical wire, a through-hole being formed in the electrical wire terminal portion;
a bolt that has a shaft portion and a head portion having a seat surface concentric to the shaft portion; and
a nut that is fastened to the bolt so as to press the wire terminal portion against the bus bar terminal portion,
wherein the shaft portion of the bolt is inserted into the through-hole of the bus bar terminal portion and the through-hole of the electrical wire terminal portion, the bus bar terminal portion and the electrical wire terminal portion are overlaid on the seat surface of the bolt, and a groove portion is circumferential to the shaft portion of the bolt and at a position where the seat surface and an outer circumferential surface of the shaft portion intersect, the seat surface being concentric to the groove portion, and, out of the through-holes of the bus bar terminal portion and the electrical wire terminal portion, a hole edge of the through-hole on a side in contact with the seat surface is arranged at a position overlapped with the groove portion as to provide a planar surface engagement between the bus bar terminal portion and the wire terminal portion and facilitate an electrical connection.

3. A connection terminal component comprising:

a bus bar terminal portion that is provided on a bus bar that serves as a conduction path, a through-hole being formed in the bus bar terminal portion;

an electrical wire terminal portion that is connected to an electrical wire, a through-hole being formed in the electrical wire terminal portion;

a bolt that has a shaft portion and a head portion having a seat surface concentric to the shaft portion; and a nut that is fastened to the bolt so as to press the wire terminal portion against the bus bar terminal portion, wherein the shaft portion of the bolt is inserted into the through-hole of the bus bar terminal portion and the through-hole of the electrical wire terminal portion, the bus bar terminal portion and the electrical wire terminal portion are overlaid on the seat surface of the bolt, and a groove portion is circumferential to the shaft portion of the bolt, the seating surface being concentric to the groove portion, and the groove portion is recessed in a direction along an axial direction of the shaft portion and at a position where the seat surface and an outer circumferential surface of the shaft portion intersect so as to provide a planar surface engagement between the bus bar terminal portion and the wire terminal portion and facilitate an electrical connection.

4. A connection terminal component comprising:

a bus bar terminal portion that is provided on a bus bar that serves as a conduction path, a through-hole being formed in the bus bar terminal portion;

an electrical wire terminal portion that is connected to an electrical wire, a through-hole being formed in the electrical wire terminal portion;

a bolt that has a shaft portion and a head portion having a seat surface concentric to the shaft portion; and a nut that is fastened to the bolt so as to press the wire terminal portion against the bus bar terminal portion, wherein the shaft portion of the bolt is inserted into the through-hole of the bus bar terminal portion and the through-hole of the electrical wire terminal portion, the bus bar terminal portion and the electrical wire terminal portion are overlaid on the seat surface of the bolt, and a groove portion is circumferential to the shaft portion of the bolt and at a position where the seat surface and an outer circumferential surface of the shaft portion intersect, the seat surface being concentric to the groove portion, and out of the through-holes of the bus bar terminal portion and the electrical wire terminal portion, a hole edge of the through-hole on a side in contact with the seat surface is arranged at a position overlapped with the groove portion so as to provide a planar surface engagement between the bus bar terminal portion and the wire terminal portion and facilitate an electrical connection.

* * * * *